United States Patent
Sachs et al.

(10) Patent No.: US 10,452,584 B2
(45) Date of Patent: Oct. 22, 2019

(54) MULTIMODE AUDIO ACCESSORY CONNECTOR

(71) Applicant: MOTOROLA SOLUTIONS, INC., Chicago, IL (US)

(72) Inventors: Daniel Grobe Sachs, Elmhurst, IL (US); Ellis A. Pinder, Davie, FL (US); Charles B. Harmke, Huntley, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/886,668

(22) Filed: Feb. 1, 2018

(65) Prior Publication Data

US 2019/0236041 A1    Aug. 1, 2019

(51) Int. Cl.
| | |
|---|---|
| *G06F 13/38* | (2006.01) |
| *G06F 13/42* | (2006.01) |
| *G06F 13/40* | (2006.01) |
| *G06F 1/26* | (2006.01) |

(52) U.S. Cl.
CPC ........ *G06F 13/385* (2013.01); *G06F 13/4081* (2013.01); *G06F 13/4282* (2013.01); *G06F 1/266* (2013.01)

(58) Field of Classification Search
CPC . H04M 1/72527; H04W 4/10; G06F 11/3051; G06F 13/385; G06F 13/4068
See application file for complete search history.

(56) References Cited

U.S. PATENT DOCUMENTS

| | | | |
|---|---|---|---|
| 7,424,312 B2 | 9/2008 | Pinder et al. | |
| 8,909,173 B2* | 12/2014 | Harmke | H04M 1/72547 455/3.06 |
| 9,606,953 B2* | 3/2017 | Talmola | G06F 13/4081 |
| 9,678,909 B1* | 6/2017 | Sachs | G06F 13/385 |
| 9,722,376 B2* | 8/2017 | Kim | H01R 13/6616 |
| 9,949,047 B2* | 4/2018 | Ryu | H04R 3/12 |
| 10,148,112 B2* | 12/2018 | Nunez | H02J 7/007 |
| 2012/0198101 A1 | 8/2012 | Porcella et al. | |
| 2014/0156884 A1 | 6/2014 | Terlizzi et al. | |
| 2018/0032350 A1* | 2/2018 | Lee | G06F 1/16 |
| 2018/0145745 A1* | 5/2018 | Sachs | G06F 13/36 |

OTHER PUBLICATIONS

Universal Serial Bus Type-C Port Controller Interface Specification Revision 2.0; Dated Oct. 2017; 103 Pages (Year: 2017).*

* cited by examiner

*Primary Examiner* — Brian T Misiura
(74) *Attorney, Agent, or Firm* — Michael Best & Friedrich LLP (57) ABSTRACT

Methods and devices for connecting an accessory device to a connector port of a mobile communication device and automatically detecting an operational mode of the connector port are provided. The method includes implementing a USB Type-C device detection at an electronic processor of the mobile communication device and monitoring a first and second pin of the connector port for pull-up and pull-down signals from a connected accessory. The method also includes interrupting the USB Type-C device detection when a pull-down signal is detected and determining whether an accessory signal is detected at a third pin of the connector port. The method also includes implementing a LMR accessory detection when the accessory signal is detected and completing the USB Type-C device detection when the accessory signal is not detected.

13 Claims, 5 Drawing Sheets

MULTIMODE AUDIO ACCESSORY CONNECTOR

BACKGROUND OF THE INVENTION

Mobile communication devices often include connector interfaces for connecting to accessories and chargers. Mobile communication devices include industry standard connection interfaces, such as universal serial bus (USB-) type interfaces, to connect to accessories. Mobile communication devices may also include other connection interfaces, such as high definition multimedia interface (HDMI), land mobile radio (LMR) interface, or the like to connect to specialty accessories, such as a remote speaker microphone or push-to-talk accessory. Including multiple interfaces on a single mobile communication device may result in higher costs.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Many universal accessories now use a USB Type-C connection interface to interface with mobile communication devices. USB Type-C is a 24-pin rotationally-symmetrical connector that provides an interface between a host device and an accessory. A USB Type-C connection interface provides several advantages over prior USB-related connection interfaces, such as smaller size, higher power rating, and high-speed data transfer. However, the audio transfer functions and robustness of USB Type-C or other industry standard connection interfaces are limited or may not be suitable for certain use cases. Some mobile communication devices use proprietary interfaces to provide high-reliability audio and data signaling, such as that needed by mission-critical communication devices.

USB Type-C interfaces and LMR interfaces use different hardware and different firmware to detect connections between the host device and the accessory. As a consequence, including multiple types of interfaces on a single mobile communication device requires additional hardware which results in higher costs and larger chipset area.

Accordingly, embodiments described here provide, among other things, devices and methods for combining detection and configuration of USB Type-C and LMR accessories into a single component. In one example, the single component is a component originally designed for USB Type-C accessory detection and configuration.

One embodiment provides a mobile communication device including a connector port, an accessory controller coupled to the connector port, and an electronic processor coupled to the accessory controller. The electronic processor is configured to implement a Universal Serial Bus (USB) Type-C device detection and monitor a first pin and a second pin of the connector port for pull-up and pull-down signals from a connected accessory. The electronic processor is also configured to detect a pull-down signal at one of the first pin and the second pin and interrupt the USB Type-C device detection in response to detecting the pull-down signal. The electronic processor is further configured to determine whether an accessory signal is detected at a third pin of the connector port in response to detecting the pull-down signal and implement a land mobile radio (LMR) accessory detection and configuration when the accessory signal is detected. The electronic processor is also configured to complete the USB Type-C device detection and configuration when the accessory signal is not detected.

Another embodiment provides a method for automatic detection of an operational mode of a connector port of a mobile communication device. The method includes implementing, using an electronic processor of the mobile communication device, a Universal Serial Bus (USB) Type-C device detection and monitoring, using the electronic processor, a first pin and a second pin of the connector port for pull-up and pull-down signals from a connected accessory. The method also includes detecting, using the electronic processor, a pull-down signal at one of the first pin and the second pin and interrupting, using the electronic processor, the USB Type-C device detection in response to detecting the pull-down signal. The method further includes determining, using the electronic processor, whether an accessory signal is detected at a third pin of the connector port in response to detecting the pull-down signal and implementing, using the electronic processor, a land mobile radio (LMR) accessory detection when the accessory signal is detected. The method also includes completing, using the electronic processor, the USB Type-C device detection when the accessory signal is not detected.

Another embodiment provides an accessory device compatible with a mobile communication device having a connector port. The accessory device includes an accessory memory storing accessory configuration data. The accessory configuration data includes information regarding configuring the connector port of the mobile communication device to operate the accessory device. The accessory device also includes an accessory interface coupled to the accessory memory. The accessory interface is configured to be connected to the connector port of the mobile communication device. The accessory device further includes an accessory electronic processor coupled to the accessory memory and the accessory interface. The accessory electronic processor is configured to detect a pull-up signal at one of a first pin and a second pin of the accessory interface and provide an accessory signal at a third pin of the accessory interface in response to detecting the pull-up signal, the accessory signal indicating to the mobile communication device that the accessory device includes the accessory memory storing accessory configuration data. The accessory electronic processor is also configured to provide, with the accessory memory, the accessory configuration data at the third pin of the accessory interface to the mobile communication device.

Another embodiment provides a method of operating an accessory device configured to be connected to a mobile communication device having a connector port. The method includes detecting, using an accessory electronic processor of the accessory device, a pull-up signal at one of a first pin and a second pin of an accessory interface of the accessory device and providing, using the accessory electronic processor, an accessory signal at a third pin of the accessory interface in response to detecting the pull-up signal. The accessory signal indicates to the mobile communication device that the accessory device includes an accessory memory storing accessory configuration data. The method also includes providing, using the accessory electronic processor with the accessory memory, accessory configuration data at the third pin of the accessory interface to the mobile communication device. The accessory configuration data includes information regarding configuring the connector port of the mobile communication device to operate the accessory device.

Figure 1:
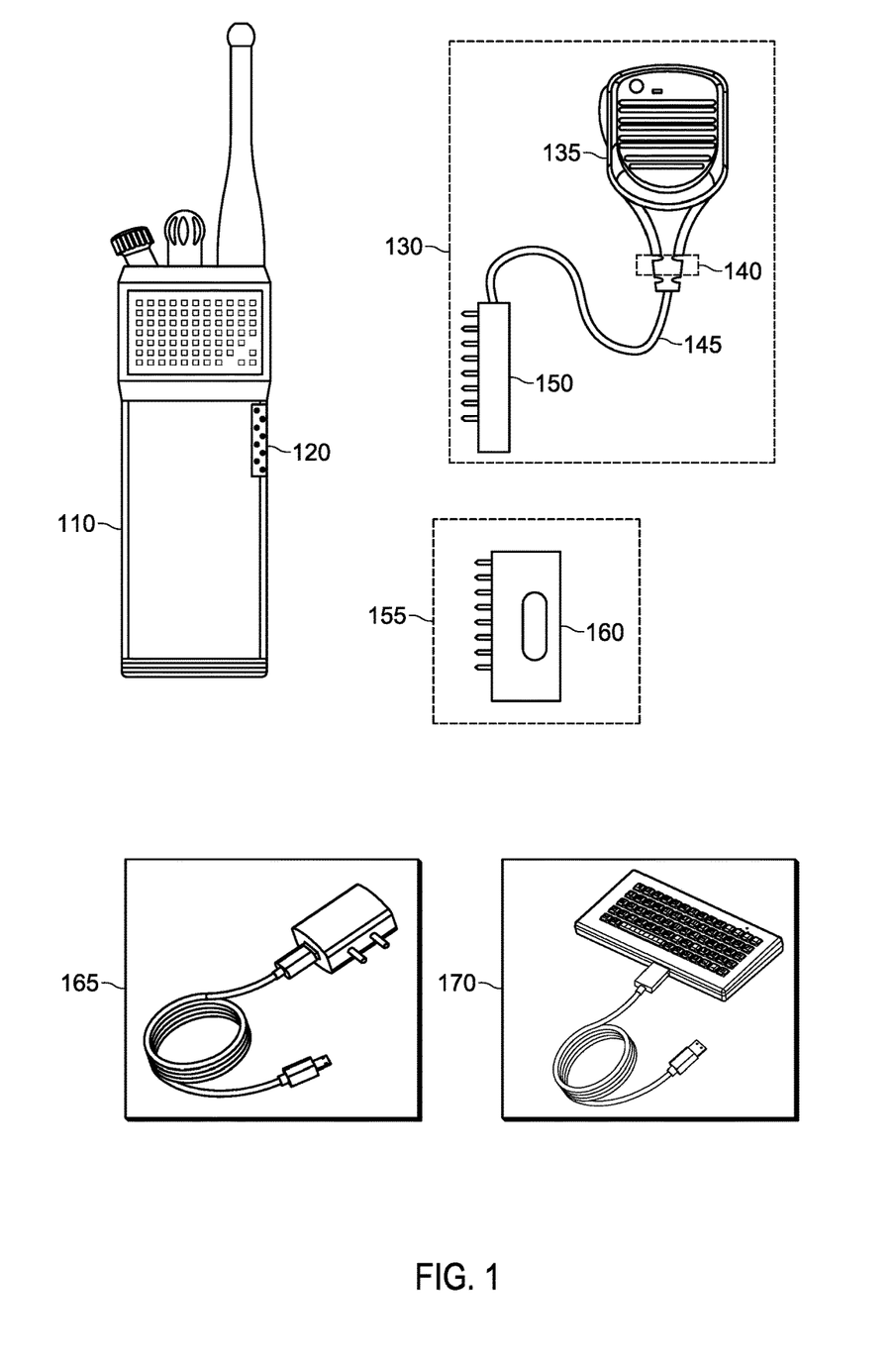
FIG. 1 illustrates a system including a mobile communication device and accessories in accordance with some embodiments.

FIG. 1 illustrates a system 100 including a mobile communication device 110 and connectable accessories. The mobile communication device 110 includes a Land Mobile Radio (LMR) connector port 120 suitable for Land Mobile Radio (LMR) operation. The mobile communication device 110 is, for example, a vehicular two-way radio, a smart telephone, a tablet computer, a smart wearable device, or the like. The LMR connector port 120 is used to connect the mobile communication device 110 to an LMR-specific accessory 130 (for example, an accessory device), such as a remote speaker microphone (illustrated), a push-to-talk accessory, a body camera, or the like. The LMR-specific accessory 130 includes an accessory assembly 135, an accessory interface 140, an accessory cable 145, and an accessory connector 150. The accessory cable 145 connects the accessory assembly 135 and the accessory interface 140 to the accessory connector 150. The accessory connector 150 is a LMR connector that interfaces with the LMR connector port 120 to mechanically and electrically couple the LMR-specific accessory 130 to the mobile communication device 110.

An accessory adapter 155 is used to connect the mobile communication device 110 to accessories that do not include an LMR connector. For example, the accessory adapter 155 is used to connect USB Type-C accessories to the mobile communication device 110. For this purpose, the accessory adapter 155 includes a USB Type-C connector port 160. As a consequence, the accessory adapter 155 allows the connection of off-the-shelf USB Type-C accessories to the mobile communication device 110, such as a charger 165, and a user input device 170. In some embodiments, rather than the accessory adapter 155, a customized cable (not shown) including an LMR connector on one end and a USB Type-C connector on the other end may be used to connect a USB Type-C accessory to the mobile communication device 110. In some embodiments, the mobile communication device 110 may include additional connector ports, such as a second LMR connector port, or a standard interface connector such as a USB Micro-B or USB Type-C connector. In these embodiments, more than one accessory may be connected to the mobile communication device 110 at the same time.

Figure 2:
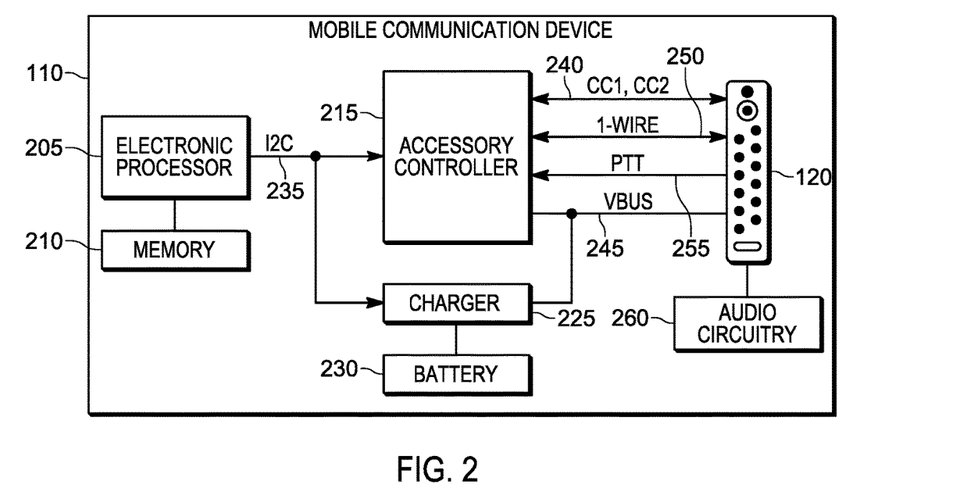
FIG. 2 is a block diagram of the mobile communication device of FIG. 1 in accordance with some embodiments.

FIG. 2 illustrates components of the mobile communication device 110. In the example illustrated, the mobile communication device 110 includes an electronic processor 205, a memory 210, an accessory controller 215, a charger 225, and a battery 230. In some embodiments, the electronic processor 205 is implemented as a microprocessor with separate memory, such as the memory 210. In other embodiments, the electronic processor 205 is implemented as a microcontroller or digital signal processor (with memory 210 on the same chip). In other embodiments, the electronic processor 205 is implemented using multiple processors. In addition, the electronic processor 205 may be implemented partially or entirely as, for example, a field-programmable gate array (FPGA), an application specific integrated circuit (ASIC), and the like and the memory 210 may not be needed or be modified accordingly. In the example illustrated, the memory 210 includes non-transitory, computer-readable memory that stores instructions that are retrieved and executed by the electronic processor 205 to carry out functionality of the mobile communication device 110 described herein. The memory 210 may include, for example, a program storage area and a data storage area. The program storage area and the data storage area may include combinations of different types of memory, such as read-only memory and random-access memory.

The accessory controller 215 may be implemented similar to the electronic processor 205. In some embodiments, the accessory controller 215 is a functional unit including multiple integrated circuits and/or electronic components such as an electronic processor, a USB Type-C Port Controller (TCPC), and/or programmable logic. When the mobile communication device 110 includes an additional native USB Type-C connector port, this additional connector port may be operated by the electronic processor 205, the accessory controller 215, or by an additional instance of the accessory controller 215 (not shown). In some embodiments, the accessory controller 215 is expanded by adding an additional Type-C Port Controller to operate the additional USB Type-C connector port. In some embodiments, the accessory controller 215 further includes an auxiliary component to provide additional input/output, for example, to access an external memory located in an accessory.

The accessory controller 215 is coupled to and controlled by the electronic processor 205 over an inter-integrated circuit (I2C) protocol connection 235. However, other connections, such as Serial Peripheral Interface (SPI) may also be used. The accessory controller 215 is connected to the LMR connector port 120 over USB control lines (CC1 and CC2) 240, a power bus (VBUS) 245, a 1-wire data bus 250, and a Push-to-talk (PTT) input 255. The USB control lines 240 includes a configuration channel, operating on either a first pin CC1 and second pin CC2, that is used to exchange pull-up and pull-down signals and USB power delivery (PD) data between the accessory controller 215 and the accessory. The accessory controller 215 thereby monitors the first pin CC1 and the second pin CC2 of the connector port 120 to detect pull-up and pull-down signals from a connected accessory. The power bus 245 provides a power connection to transfer power to or from the accessory. The 1-wire data bus 250 (that is, a third pin) allows the accessory controller 215 to access data stored in a memory of the accessory, such as an accessory identifier, accessory configuration data, and the like. In some embodiments, the 1-wire data bus 250 is overlaid on the USB control lines 240, for example, on the first pin CC1 and the second pin CC2 of the connector port 120. In addition, although a 1-wire data bus 250 is illustrated other communication protocols may be used to implement the accessory controller 215 accessing data from the accessory memory.

In some embodiments, the charger 225 is a power management integrated circuit (PMIC) sold by ROHM™ semiconductor. The charger 225 is coupled to the battery 230 and the power bus 245. The charger 225 transfers power between the battery 230 and the accessory to support both power input from and power output to the accessory. The charger 225 is coupled to and controlled by the electronic processor 205 over an inter-integrated circuit protocol connection. In some embodiments, the charger 225 is coupled to and controlled by the accessory controller 215.

In some embodiments, the mobile communication device 110 additionally includes audio circuitry 260 providing audio signals to and receiving audio signals from the LMR connector port 120. The audio circuitry 260 provides audio operation for the mobile communication device 110 such that the audio signals may be played back to and received from the connected LMR audio accessory. The audio signals are provided over dedicated pins of the connector port 120 to permit higher power and increased reliability.

Figure 3:
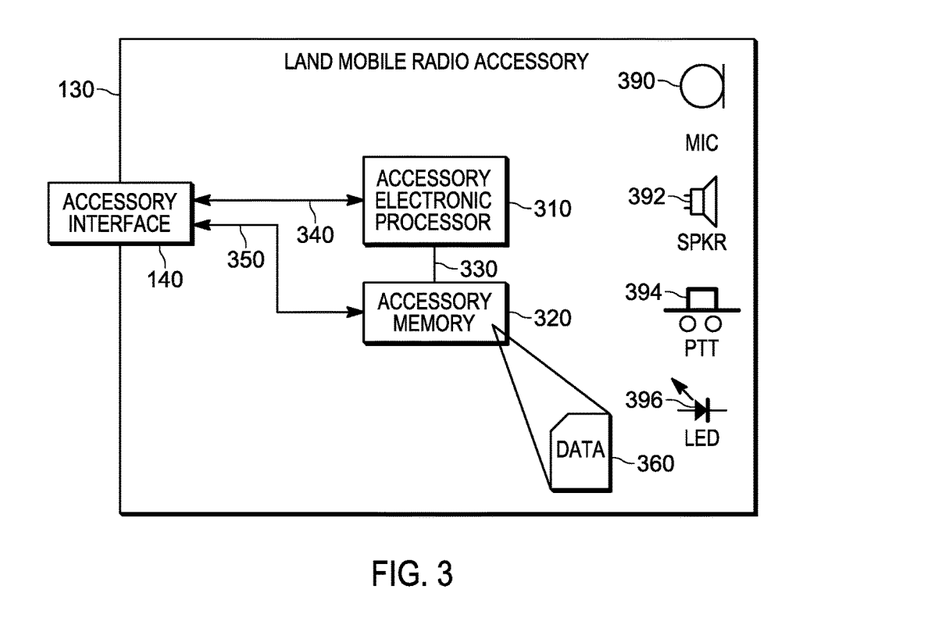
FIG. 3 is a block diagram of a land mobile radio accessory in accordance with some embodiments.

FIG. 3 illustrates components of the Land Mobile Radio (LMR) accessory 130 that is connectable to the mobile communication device 110 through the LMR connector port 120. The LMR accessory 130 may include, for example, an LMR speaker, an LMR microphone, a Push-to-Talk (PTT) accessory including a push-to-talk button, or the like. The illustrated LMR accessory 130 is an LMR sink accessory that receives operating power from the mobile communication device 110. In the example illustrated, the LMR accessory 130 includes an accessory electronic processor 310, an accessory memory 320, and an accessory interface 140. In some embodiments, processor 310 may contain internal random access memory (RAM) or read only memory (ROM). In some embodiments, the memory 320 is a supplemental non-volatile data storage memory that is used to store accessory configuration. The accessory electronic processor 310 and the accessory memory 320 are coupled by an accessory bus 330. The accessory electronic processor 310 is coupled to the accessory interface 140 over a processor bus 340 (that is, a first pin and a second pin), for example, a USB Power Delivery (PD) bus. The accessory memory 320 is coupled to the accessory interface 140 over a memory bus 350 (that is, a third pin). In some embodiments, the accessory memory 320 is a single wire memory device and the memory bus 350 is a single-wire interface. However, multi-wire interfaces, including I2C, SPI, or the like may be used for the memory bus 350. In some embodiments, the accessory memory 320 is provided in the accessory connector 150 rather than in the accessory assembly 135. In these embodiments, the memory bus 350 may not be needed or may be modified accordingly.

The accessory memory 320 stores accessory configuration data 360 which provides information to the mobile communication device 110 on how to configure the LMR connector port 120 and how to operate the LMR accessory 130. The data in the accessory memory 320 is accessed by the accessory controller 215. In some embodiments, the accessory controller 215 reads, processes, and acts upon the accessory configuration data 360. In other embodiments, the accessory controller 215 reads the accessory configuration data 360 on behalf of the electronic processor 205 and the electronic processor 205 processes and acts upon the accessory configuration data 360. In yet other embodiments, a first subset of accessory configuration data 360 is processed by the accessory controller 215 and a second subset of the accessory configuration data 360 is processed by the electronic processor 205. The accessory configuration data 360 may include portions of data associated with various functionality operating across the electronic processor 205 and the accessory controller 215.

As described above, the accessory electronic processor 310 is coupled to the accessory interface 140 over the processor bus 340. The processor bus 340 includes a power channel (for example, VBUS and VCC) to receive power from the mobile communication device 110 and one or more configuration channels (CC1 and CC2) to receive detection and configuration signals from the mobile communication device 110. The configuration channels couple configuration pins (for example, the first pin CC1 and the second pin CC2) of the connector port 120 to pins of the accessory electronic processor 310.

As described above, the accessory memory 320 is coupled to a pin (for example, a third pin) of the accessory interface 140 over the memory bus 350. When the accessory interface 140 is coupled to the LMR connector port 120 the memory bus 350 is coupled to the 1-wire data bus 250. The LMR accessory 130 optionally includes other components, for example, a microphone component 390, a speaker component 392, a push-to-talk component 394, a light emitting diode (LED) 396, or the like that receive operation data or signals from the accessory interface 140. For example, the LMR accessory 130 receives audio signals from the mobile communication device 110 through the accessory interface 140.

Figure 4:
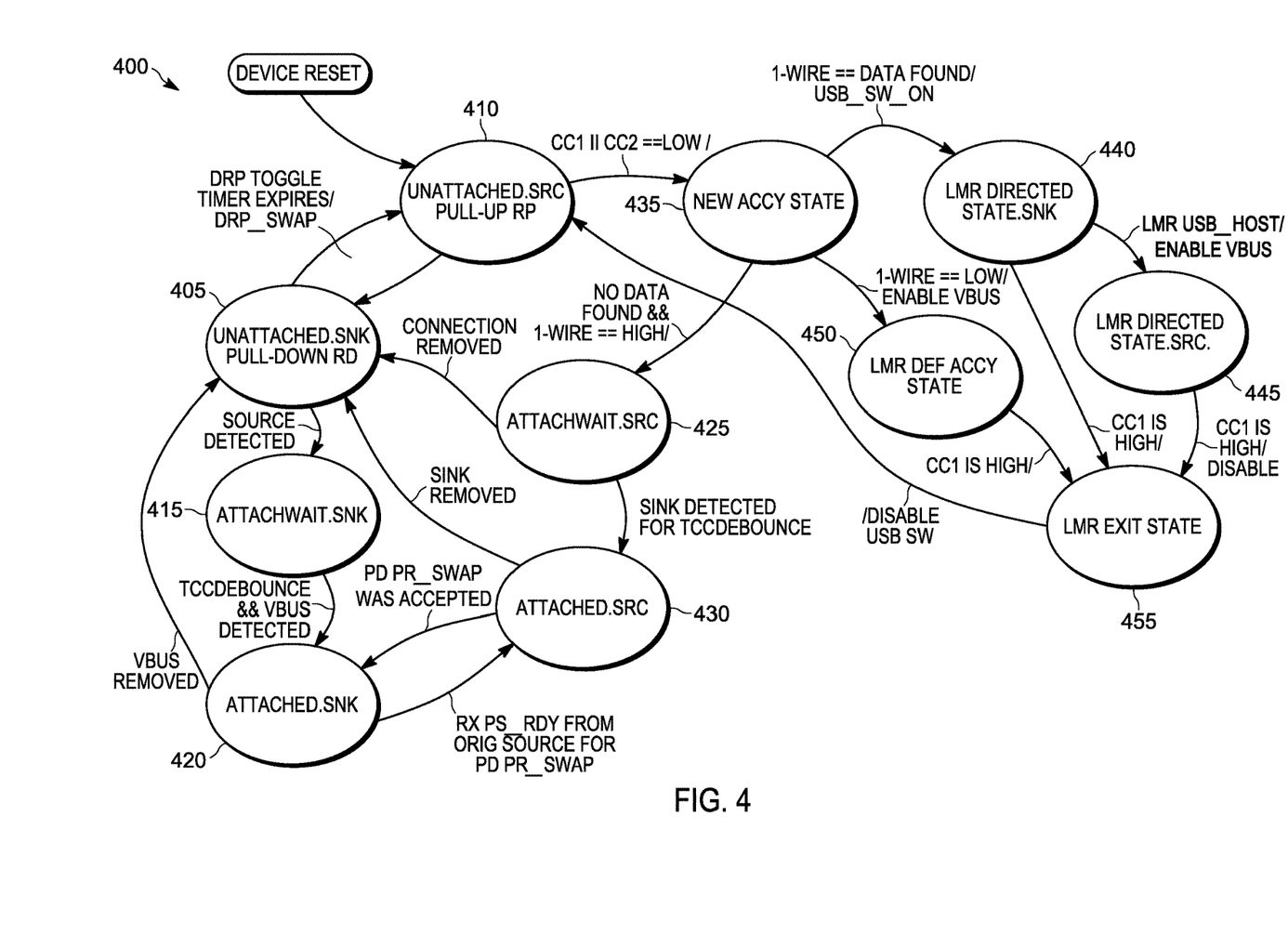
FIG. 4 is a state machine implemented by an accessory controller of the mobile communication device of FIG. 1 in accordance with some embodiments.

FIG. 4 is a detection state machine 400 implemented by the accessory controller 215. The state machine 400 combines an industry standard state machine used to detect a USB Type-C accessory with a state machine used to detect the LMR accessory 130. In the example illustrated, only relevant states of the state machine 400 are depicted to simplify the explanation. The state machine 400 includes other states not explicitly described herein. The state machine 400 is initially in one of an unattached sink state 405 (for example, Unattached.SNK) or an unattached source state 410 (for example, Unattached.SRC). The state machine 400 transitions from the unattached sink state 405 to the unattached source state 410 when a toggle timer expires. The toggle timer is restarted after every transition between the unattached sink state 405 and the unattached source state 410.

In the unattached sink state 405, the accessory controller 215 is waiting to detect the presence of USB Type-C source. A USB Type-C source is a power delivery device or accessory that provides operating or charging power to the mobile communication device 110. The state machine 400 transitions from the unattached sink state 405 to the attach wait sink state 415 (for example, AttachWait.SNK) when a source connection is detected.

In the attach wait sink state 415, the accessory controller 215 has detected a USB Type-C source (for example, the charger 165) and is waiting for a power input (VBUS) from the USB Type-C source. The state machine 400 transitions from the attach wait sink state 415 to attached sink state 420 (for example, Attached. SNK) when the power input (VBUS) is detected for at least a predetermined amount of time (tCCDebounce). In the attached sink state 420, the mobile communication device 110 is connected to a USB Type-C accessory and receives charging power from the accessory. The state machine 400 transitions from the attached sink state 420 to the unattached sink state 405 when the accessory controller 215 detects that the power input (VBUS) is removed. The state machine 400 transitions from the attached sink state 420 to the attached source (Attached.SRC) state 430 when the accessory controller 215 receives a power role swap signal from the electronic processor 205.

In the attach wait source (AttachWait.SRC) state 425, the accessory controller 215 has detected a USB Type-C sink (for example, the user input device 170) and is waiting to determine whether a pull-down signal detected at the configuration channels (CC1 and CC2) are stable. The state machine 400 transitions from the attach wait source state 425 to attached source state 430 when the pull-down signal on one or more of the configuration channels (CC1 and CC2) is detected for at least a predetermined amount of time (tCCDebounce). In the attached source state 430, the mobile communication device 110 is connected to a USB Type-C accessory and provides operating power to the accessory. The state machine 400 transitions from the attached source state 430 to the unattached source state 410 when the accessory controller 215 detects that there is no signal on the configuration channels (CC1 and CC2). The state machine 400 transitions from the attached source state 430 to the attached sink state 420 when the accessory controller 215 receives a power role swap signal from the electronic processor 205.

In the unattached source state 410, the accessory controller 215 is waiting to detect the presence of a USB Type-C sink. A USB Type-C sink is a device or accessory that receives operating power from the mobile communication device 110. Unlike in a standard USB Type-C implementation, the state machine 400 transitions from the unattached source state 410 to the new accessory state 435 when the accessory controller 215 detects a pull-down signal at one or both of the configuration channels (CC1 and CC2) of the USB control lines 240.

In the new accessory state 435, the accessory controller 215 monitors the first pin CC1 and the second pin CC2 of the connector port 120 for an accessory signal from a Land Mobile Radio (LMR) accessory 130 over the 1-wire data bus 250. That is, the state machine 400 attempts to read accessory configuration data 360 from the accessory memory 320. The state machine 400 transitions from the new accessory state 435 to one of a LMR directed state (for example, a LMR directed sink state 440 (LMRDirectedState.SNK) or LMR directed source state 445 (LMRDirectedState.SRC) or a LMR Default Accessory state 450 when the accessory configuration data 360 is read. The state machine 400 transitions from the new accessory state 435 to the attach wait source state 425 when the accessory configuration data 360 is not successfully read for a predetermined time period. In some embodiments, the 1-wire data bus 250 may be removed or shorted to ground on the connector port 120.

In the LMR directed sink state 440, the LMR directed source state 445, and the LMR Default Accessory state 450, the accessory controller 215 receives accessory configuration data 360 from the accessory memory 320. The accessory controller 215 configures the connector port 120 for a connection between the mobile communication device 110 and the LMR accessory 130. The state machine 400 transitions from the LMR directed sink state 440, the LMR directed source state 445, and the LMR Default Accessory state 450 to the LMR exit state 455 (ExitState) when the accessory controller 215 no longer detects a pull-down signal at one or both of the configuration channels (CC1 and CC2). The state machine 400 transitions from the LMR exit state 455 to the unattached source state 410 when the accessory controller 215 receives a disable signal from the electronic processor 205.

As described above, states 405, 410, 415, 420, 425, and 430 are directed to the industry standard USB Type-C device detection state machine. The USB Type-C device detection state machine is modified as illustrated in FIG. 4 to additionally detect an LMR accessory and discern between two accessory types (for example, an LMR accessory type and USB Type-C accessory type) to allow the corresponding configuration of the connector port 120. Accordingly, the state machine 400 allows the mobile communication device 110 to automatically detect whether a connected accessory is a USB Type-C accessory or the LMR accessory 130. The accessory controller 215 is described as largely executing the state machine and reading the accessory configuration data 360. However, the state machine 400 may be partially or completely be executed by the electronic processor 205.

Figure 5:
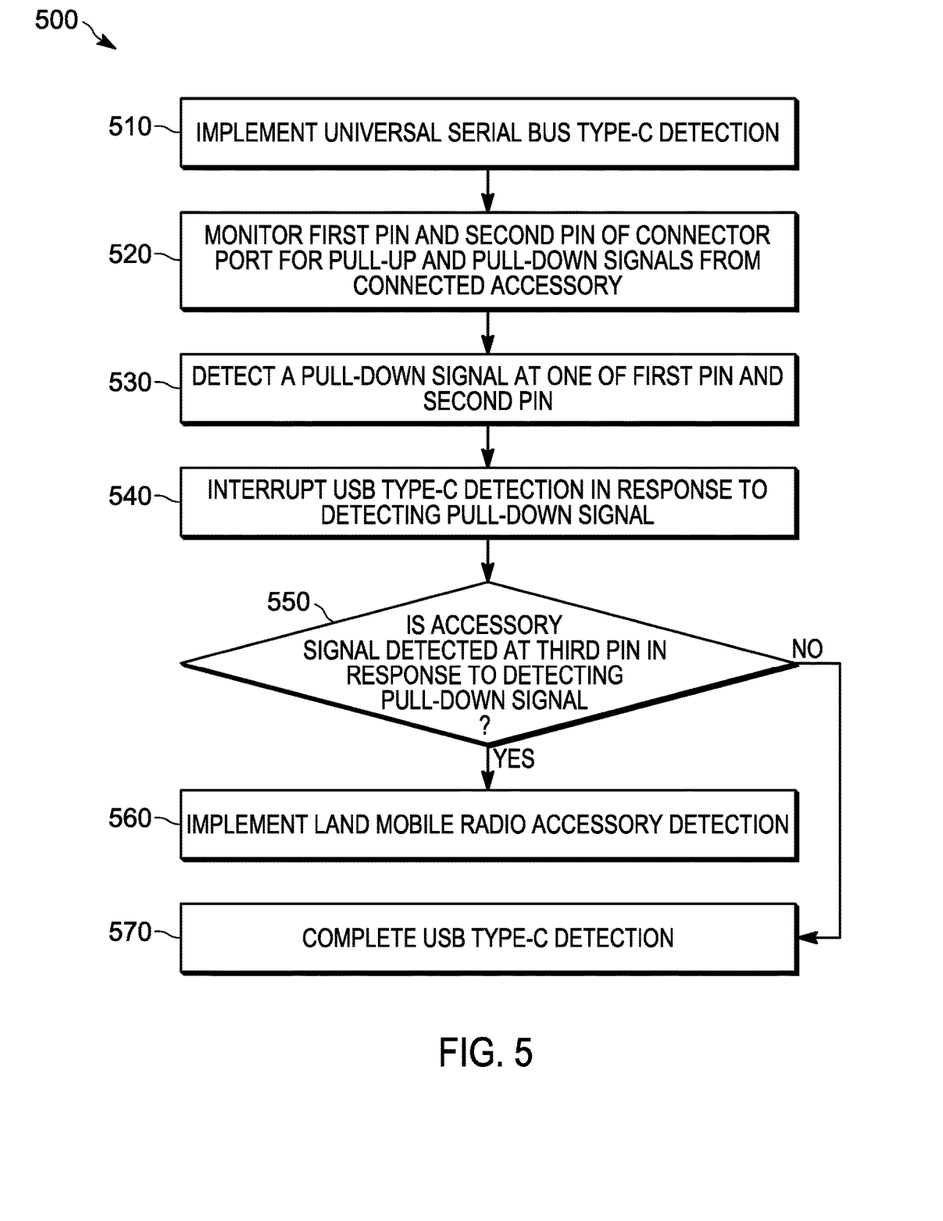
FIG. 5 is a flowchart of a method for automatic detection of an operational mode of an accessory interface implemented by the mobile communication device of FIG. 1 in accordance with some embodiments.

FIG. 5 illustrates a flowchart of an example method 500 for automatic detection of an operational mode of the connector port 120 implemented by the mobile communication device 110. The method 500 includes implementing, using the electronic processor 205 of the mobile communication device 110, a USB Type-C device detection (at block 510). The accessory controller 215 toggles between the unattached source state 410 and unattached sink state 405 until an accessory connection is detected to implement the USB Type-C device detection. The method 500 further includes monitoring, using the accessory controller 215, the first pin and the second pin of the connector port 120 for pull-up and pull-down signals from a connected accessory (at block 520). The first pin and the second pin provide input to the configuration channels (CC1 and CC2). In the unattached source state 410, the accessory controller 215 attempts to provide a pull-down signal at the configuration channels (CC1 and CC2). That is, the accessory controller 215 attempts to provide a power supply to the configuration channels (CC1 and CC2). Accordingly, when an accessory that is a USB sink is connected, the accessory receives power supply from the mobile communication device 110. The accessory controller 215 determines that the accessory is connected when the pull-down signal indicating that the accessory is drawing power is detected at the configuration channels (CC1 and CC2). Similarly, in the unattached sink state 405, the accessory controller 215 attempts to draw a pull-up signal at the configuration channels (CC1 and CC2). That is, the accessory controller 215 attempts to receive a power supply from the configuration channels (CC1 and CC2). Accordingly, when an accessory that is a USB source is connected, the mobile communication device 110 receives power supply from the accessory. The accessory controller 215 determines that the accessory is connected when the pull-up signal indicating that the accessory is providing power is detected at the configuration channels (CC1 and CC2).

The method 500 also includes detecting a pull-down signal at one of the first pin and the second pin of the connector port 120 (at block 530). When the LMR accessory 130 is coupled to the mobile communication device 110, the LMR accessory 130 attempts to draw power from the first pin and/or the second pin of the connector port 120. The accessory controller 215 is configured to detect the pull-down signal when the accessory controller 215 determines that the LMR accessory 130 is drawing power from the configuration channels (CC1 and CC2).

The method 500 includes interrupting, using the accessory controller 215, the USB Type-C device detection in response to detecting the pull-down signal (at block 540). When the accessory controller 215 detects the pull-down signal in the unattached source state 410, the accessory controller 215 exits from the USB Type-C device detection state machine. The accessory controller 215 enters the new accessory state 435 from the USB Type-C device detection state machine to check whether the connected accessory is the LMR accessory 130.

The method 500 includes determining whether an accessory signal is detected at a third pin (that is, at the 1-wire data bus 250) in response to detecting the pull-down signal on the first pin CC1 or the second pin CC2 (at block 550). When the LMR accessory 130 detects a pull-up signal at the accessory interface 140, the LMR accessory 130 sends an accessory signal to the mobile communication device 110. In some embodiments, the accessory signal is sent on the 1-wire data bus 250, and the accessory signal is a timed low-going pulse of approximately 480 micro-seconds (for example, a Maxim™ 1-wire presence pulse). In some embodiments, the accessory signal is overlaid on the configuration channels, that is, the first pin CC1 or the second pin CC2. That is, the third pin shares a pin with the first pin CC1 or the second pin CC2. The accessory signal indicates that the LMR accessory 130 includes a configuration memory to the accessory controller 215. A USB Type-C accessory, on the other hand, does not send the accessory signal to the mobile communication device 110.

The method 500 includes implementing a land mobile radio accessory detection (at block 560) when the accessory signal is detected. In the new accessory state 435, when the accessory signal is detected, the state machine 400 transitions to one of the LMR directed sink state 440, LMR directed source state 445, and the LMR Default Accessory state 450 depending on the accessory signal detected. The accessory controller 215 receives configuration data over the 1-wire data bus 250 from the LMR accessory 130. The accessory controller 215 configures the connector port 120 for the LMR accessory 130 based on the accessory configuration data 360.

The method 500 includes completing the USB Type-C device detection (at block 570) when the accessory signal is not detected. The state machine 400 transitions to the attach wait source state 425 when the accessory signal is not detected for a predetermined period of time. The accessory controller 215 then completes detection of a USB Type-C accessory and configures the connector port 120 for the USB Type-C accessory.

Figure 6:
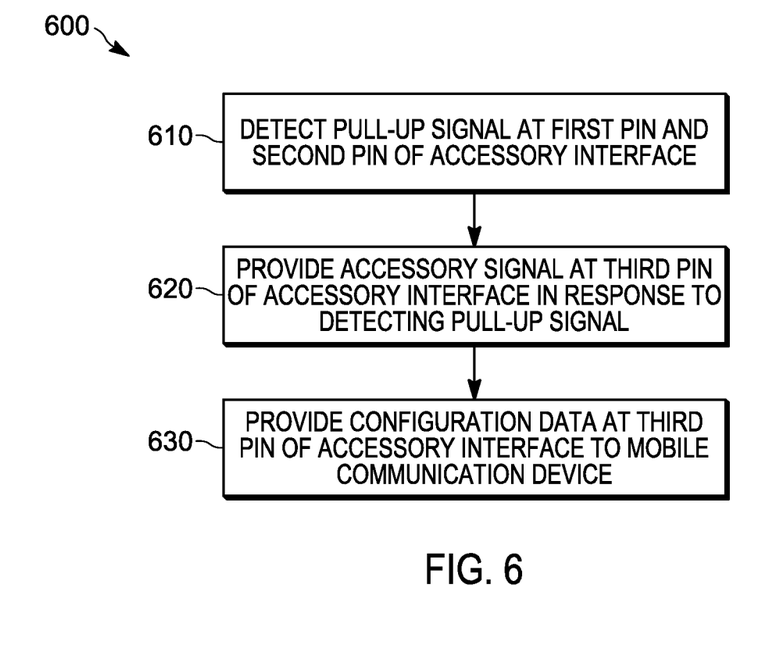
FIG. 6 is a flowchart of a method of operating the land mobile radio accessory of FIG. 3 in accordance with some embodiments.

FIG. 6 is a flowchart of an example method 600 of operating the LMR accessory 130. The method 600 includes detecting, using the accessory electronic processor 310, a pull-up signal at a first pin CC1 or a second pin CC2 (that is, at the processor bus 340) of the accessory interface 140 (at block 610). The accessory electronic processor 310 is configured to monitor the one or more configuration channels (first pin CC1 and second pin CC2) for a pull-up signal. The configuration channels (CC1 and CC2) receive a pull-up signal when the LMR accessory 130 is connected to the mobile communication device 110. The accessory electronic processor 310 detects the pull-up signals by attempting to draw power from the configuration channels (CC1 and CC2).

The method 600 further includes providing, using the accessory electronic processor 310, an accessory signal at a third pin (that is, the memory bus 350) of the accessory interface 140 in response to detecting the pull-up signal (at block 620). The accessory signal indicates to the mobile communication device 110 that the LMR accessory 130 includes a configuration memory (that is, accessory memory 320) that stores configuration data relating to the LMR accessory 130.

The method 600 also includes providing, using the accessory electronic processor 310 with the accessory memory 320, the accessory configuration data 360 at the third pin of the accessory interface 140 to the mobile communication device 110 (at block 630). The accessory memory 320 provides the accessory configuration data 360 to the mobile communication device 110 over the memory bus 350. The accessory configuration data 360 may be transferred to the mobile communication device 110 in response to or after providing the accessory signal to the mobile communication device 110.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A mobile communication device comprising:
   a connector port;
   an accessory controller coupled to the connector port;
   an electronic processor coupled to the accessory controller and configured to:
      implement a Universal Serial Bus (USB) Type-C device detection;
      monitor a first pin and a second pin of the connector port for pull-up and pull-down signals from a connected accessory;
      detect a pull-down signal at one of the first pin and the second pin;
      interrupt the USB Type-C device detection in response to detecting the pull-down signal;
      determine whether an accessory signal is detected at a third pin of the connector port in response to detecting the pull-down signal;
      implement a land mobile radio (LMR) accessory detection and configuration when the accessory signal is detected; and
      complete the USB Type-C device detection and configuration when the accessory signal is not detected.

2. The mobile communication device of claim 1, wherein the electronic processor implementing the LMR accessory detection is further configured to:
   receive, at the accessory controller, accessory configuration data corresponding to a Land Mobile Radio (LMR) accessory from the LMR accessory, the LMR accessory having at least one selected from a group consisting of a speaker, a microphone, and a Push-to-Talk (PTT) button.

3. The mobile communication device of claim 2, wherein the electronic processor is further configured to:
   configure the connector port for the LMR accessory based on the accessory configuration data.

4. The mobile communication device of claim 2, further comprising an audio circuit providing audio signals to the connector port.

5. The mobile communication device of claim 2, wherein the accessory controller accesses an accessory memory of the LMR accessory through the connector port to receive the accessory configuration data.

6. The mobile communication device of claim 1, wherein the third pin is overlaid on one of the first pin and the second pin.

7. The mobile communication device of claim 1, wherein the accessory controller is a USB Type-C port controller.

8. A method for automatic detection of an operational mode of a connector port of a mobile communication device, the method comprising:
   implementing, using an electronic processor of the mobile communication device, a Universal Serial Bus (USB) Type-C device detection;
   monitoring, using the electronic processor, a first pin and a second pin of the connector port for pull-up and pull-down signals from a connected accessory;
   detecting, using the electronic processor, a pull-down signal at one of the first pin and the second pin;
   interrupting, using the electronic processor, the USB Type-C device detection in response to detecting the pull-down signal;
   determining, using the electronic processor, whether an accessory signal is detected at a third pin of the connector port in response to detecting the pull-down signal;
   implementing, using the electronic processor, a land mobile radio (LMR) accessory detection when the accessory signal is detected; and
   completing, using the electronic processor, the USB Type-C device detection when the accessory signal is not detected.

9. The method of claim 8, wherein implementing the LMR accessory detection further comprises:
   receiving, at an accessory controller, accessory configuration data corresponding to a Land Mobile Radio (LMR) accessory from the LMR accessory, the LMR accessory having at least one selected from a group consisting of a speaker, a microphone, and a Push-to-Talk (PTT) button.

10. The method of claim 9, further comprising:
 configuring the connector port for the LMR accessory based on the accessory configuration data.

11. The method of claim 9, further comprising providing audio signals over the connector port to the LMR accessory.

12. The method of claim 9, wherein receiving the accessory configuration data further comprises accessing an accessory memory of the LMR accessory through the connector port.

13. The method of claim 8, wherein the third pin is overlaid on one of the first pin and the second pin.

* * * * *